United States Patent
Volz

(10) Patent No.: US 6,742,764 B1
(45) Date of Patent: Jun. 1, 2004

(54) ELECTROMAGNETIC VALVE

(75) Inventor: Peter Volz, Darmstadt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 107 days.

(21) Appl. No.: 10/069,152

(22) PCT Filed: Aug. 11, 2000

(86) PCT No.: PCT/EP00/07864

§ 371 (c)(1),
(2), (4) Date: Feb. 21, 2002

(87) PCT Pub. No.: WO01/14776

PCT Pub. Date: Mar. 1, 2001

(30) Foreign Application Priority Data

Aug. 25, 1999  (DE) .......................................... 199 40 179
Feb. 3, 2000   (DE) .......................................... 100 04 692

(51) Int. Cl.⁷ .............................................. F16K 31/06
(52) U.S. Cl. .............................. 251/129.02; 251/129.18
(58) Field of Search ...................... 251/129.02, 129.15, 251/129.18; 303/119.2; 335/278

(56) References Cited

U.S. PATENT DOCUMENTS

| | | | | |
|---|---|---|---|---|
| 5,601,275 A | * | 2/1997 | Hironaka ................ | 251/129.15 |
| 5,810,330 A | | 9/1998 | Eith et al. | |
| 6,318,703 B1 | * | 11/2001 | Goossens et al. ...... | 251/129.15 |
| 6,325,467 B1 | * | 12/2001 | Seitz et al. .............. | 303/113.1 |

FOREIGN PATENT DOCUMENTS

| | | |
|---|---|---|
| DE | 40 30 571 | 4/1992 |
| DE | 196 46 835 | 5/1998 |
| DE | 197 27 654 | 1/1999 |
| DE | 197 39 886 | 3/1999 |
| DE | 198 36 494 | 10/1999 |
| WO | WO 99/31578 A1 * | 7/1998 .............. B60T/8/36 |

OTHER PUBLICATIONS

Search Report of the German Patent Office for Appln 10004692.4.

* cited by examiner

*Primary Examiner*—Gene Mancene
*Assistant Examiner*—Patrick Buechner
(74) *Attorney, Agent, or Firm*—Rader, Fishman & Grauer PLLC

(57) ABSTRACT

The present invention relates to an electromagnetic valve including a valve housing accommodating a magnet armature, a magnet core member, a valve closure member, and a valve seat to which a magnet coil can be fitted. The valve housing is composed of a first deep-drawn sleeve member and a second sleeve member that can be inserted telescopically into the first sleeve member. The second sleeve member has an open end remote from the first sleeve member which is preferably configured as a metal sealing seat with a valve accommodating member.

7 Claims, 1 Drawing Sheet

ELECTROMAGNETIC VALVE

TECHNICAL FIELD

The present invention generally relates to valves and more particularly relates to an electromagnetic valve.

BACKGROUND OF THE INVENTION

DE 196 03 381 A1 discloses an electromagnetic valve of the indicated type which, for the purpose of attachment of the valve housing in the valve accommodating member, includes a magnet end plate having a clinched contour, on which a valve coil with a yoke ring is seated. The magnet end plate additionally receives the open end of a dome-shaped sleeve member. The valve seat is attached to a cylinder insert which extends into the sleeve member up to a magnet armature.

Consequently, the valve housing is comprised of the cylinder insert which extends into the sleeve member and the valve seat fastened thereto. The cylinder insert is made from a solid turned part due to the press-in force which acts upon the valve housing. The total manufacturing effort for the valve is relatively high.

An object of the present invention is to manufacture an electromagnetic valve of the indicated type with least possible effort and structure, and another objective is to limit the mechanical stress on the valve and to limit the necessary adjustment measures to a minimum.

DETAILED DESCRIPTION OF THE PREFERRED EMBODIMENTS

Figure 1:
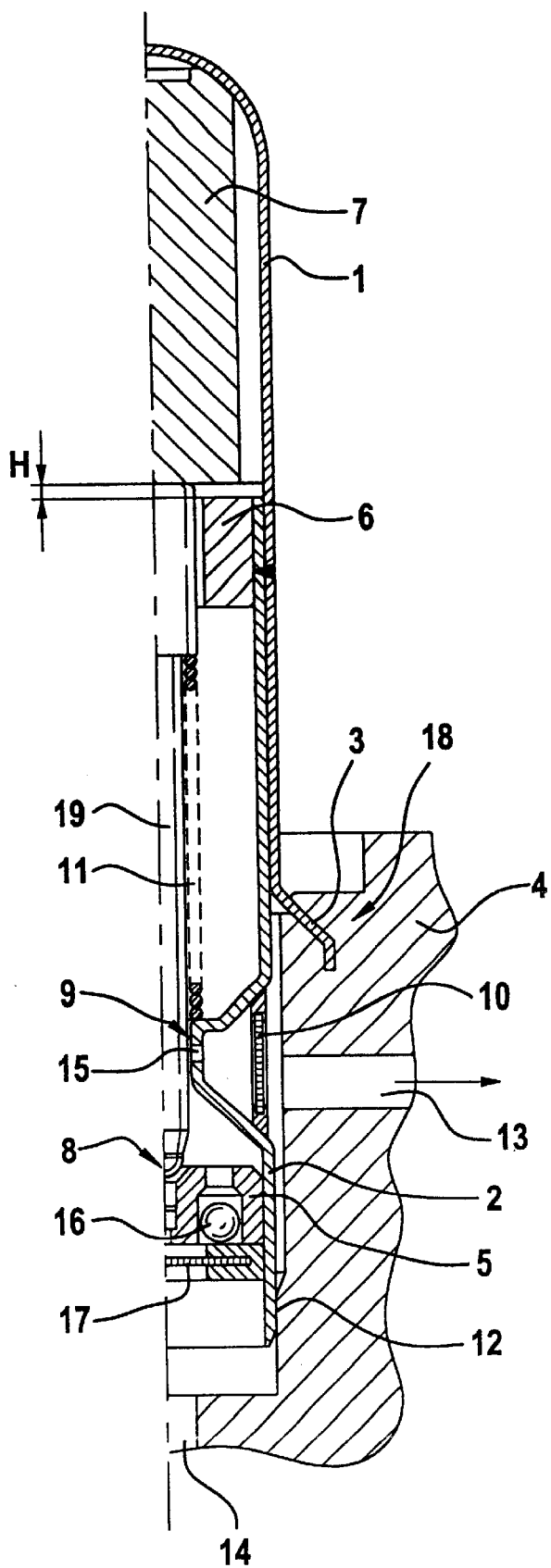
FIG. 1 is an enlarged cross-section of one-half of the electromagnetic valve of the present invention.

FIG. 1 shows a considerably enlarged view of a cross-section taken through an electromagnetic valve having a valve housing which is composed of two sleeve members 1, 2 that are assembled in one another and formed as sheet-metal deep-drawn parts. Thus, an independently operable and functionally preassembled valve assembly is manufactured which receives a plate-shaped valve seat 5 in the bottom, second sleeve member 2 according to the drawing. The valve assembly carries a magnet armature 7 in the dome-shaped closed sleeve member 1. The open end of the second sleeve member 2 remote from the first sleeve member 1 has an elastic press fit functioning as a metal sealing seat 12 which is achieved in conjunction with the bore wall of the valve accommodating member 4, thereby preventing the free flow of fluid between the two pressure fluid channels 13, 14 that extend through the valve accommodating member 4, along the wall, i.e., between the electromagnetic valve and the valve accommodating member 4. Both sleeve members 1, 2 with their portions remote from the valve seat 5 and the magnet armature 7 are slid telescopically into each other and undetachably coupled in this overlapping area from the outside by means of laser welding 20. To attach the valve housing composed of the two sleeve members 1, 2 in the valve accommodating member 4 according to the drawing, the outward, first sleeve member 1 which projects from the second sleeve member 2 includes at the initially open end a conical retaining collar 3 which is reliably and pressure-fluid tightly attached in a valve accommodating bore by way of an outside calked portion 18 at the surface of the valve accommodating member 4. Instead of the outside calked portion 18 shown herein, it is also possible if needed to directly weld the retaining collar 3 to the valve accommodating member 4, provided the materials are appropriate for welding.

The inside retaining member 2, which is disposed in the valve accommodating member 4 and in the first retaining member 1, further includes a preferably cavetto-type constricted or tapered stepped portion 9 at the level of the pressure fluid channel 13 that extends horizontally in the valve accommodating member 4. The outside area of the stepped portion 9 is suitably encompassed by an annular filter 10. Stepped portion 9 additionally assumes a guiding function at the tappet 19 of the valve closure member 8 to permit the exact centering of the valve closure member 8 in relation to the valve seat 5. On the other hand, the stepped portion 9 assuming the function of a resilient stop ensures that the resetting spring 11 is supported which urges the tappet 19 against the magnet armature 7.

An annular part that acts as a magnet core 6 and is conformed to the inside contour of the second sleeve member 2 is retained operatively in the vicinity of the magnet armature 7. Tappet 19 extends through the annular part towards the end surface of the magnet armature 7 facing it and loosely abuts thereon, for what reason tappet 19 is guided in the annular part with a small clearance fit.

The pressure fluid connection between the pressure fluid channels 13, 14 which are arranged transversely and longitudinally with respect to the valve rotation axis in the valve accommodating member 4 is ensured in the electromagnetically normally open basic valve position, as shown in the drawing. There is an interruption of the pressure fluid connection by way of the valve seat 5 that is then closed by the valve closure member 8 in the electromagnetically energized valve switch position. Subsequently, no exchange of pressure fluid takes place between the two pressure fluid channels 13, 14 by way of the through-bore 15 placed in the second, inward sleeve member 2 at the level of the stepped portion 9. If desired or required, through-bore 15 may be designed as a calibration bore, e.g. made in a punching operation, which will then adopt the function of a diaphragm.

The object of the present invention, i.e., to provide a low-cost, normally open electromagnetic valve, is achieved by using the above-mentioned constructive features and by including appropriate cold-impact forming and sheet-metal forming techniques. In addition, the valve construction disclosed renders possible a particularly simple valve assembly and adjustment of the residual air slot of the magnet armature and of the entire valve stroke.

As can be taken from FIG. 1, the electromagnetic valve is configured as a surprisingly simple welded cartridge. The pretested and already preadjusted and welded electromagnetic valve is positioned on the sealing seat 12 in the valve accommodating member 4 and reliably fixed in position in the valve accommodating member 4 due to the outside calked portion 18 at the retaining collar 3. The sealing seat 12 includes an elastic and metal press fit. The outside calked portion 18 is effected by plastic deformation of the valve accommodating member 4 that preferably consists of an aluminum wrought alloy, and an angled separating line.

The valve seat 5 designed as a valve plate is sealingly press fitted in the inside sleeve, that means, in the second sleeve member 2, and, if necessary, additionally seal-tightly connected thereto by laser welding. The valve plate receives a non-return valve 16. In the illustrated design, the ball of the non-return valve 16 is retained in a by-pass bore of the valve seat 5 by the frame of a plate filter 17 which is partly recessed. The stepped portion 9 may either be indented over the full periphery or impressed partially on at least three locations in the periphery. The filter 10 is preferably snapped into the waist or recess of the stepped portion 9. When requested or required, the filter 10 may also be arranged in the interspace which is formed by the second sleeve member 2 and the valve accommodating member 4.

The residual air slot H may be adjusted very precisely and simply in the construction chosen by introducing the tappet 19 into the second sleeve member 2 that includes the valve seat 5 and the magnet core 6 and by adjusting the slot size by displacing the magnet core 6 with a stepped tool. The magnet core 6 with the second sleeve 2 is fixed after the adjustment.

This fixing action may be carried out by a calking operation or a partial welding operation. The residual air slot H is thus adjusted in an extremely precise fashion.

The tappet stroke at the valve seat 5 may now be adjusted in a straightforward manner by sliding the first sleeve member 1 that includes the magnet armature to and fro on the second sleeve member 2. The desired tappet stroke may be adjusted by measuring the air throughflow at the valve seat 5 or by determining the difference in size between the magnet armature 7, the tappet 19 and between the second sleeve member 2 and the first sleeve member 1.

Another, simple method of adjustment for the tappet stroke resides in pressing the tappet 19, along with the magnet armature 7 and the first sleeve member 1, onto the valve seat 5 fastened in the second sleeve 2, to measure the total length of the valve or a reference dimension. This measurement result is then increased by the desired tappet stroke by drawing both valve sleeves apart, that means, by drawing the sleeve members 1, 2 apart. Now the tappet stroke is exactly adjusted. After the total stroke at the valve seat 5 is adjusted, the first sleeve member 1 is welded to the second sleeve member 2 at least partly, yet a shearing operation is also possible instead of the welded joint. The length of the second sleeve member 2 and the length of the magnet core 6 may be conformed optimally to the conditions of the magnetic coil which is not shown.

It is advantageous, among others, to use a corrosion-resistant sleeve material for the first sleeve member 1 which protects the other components of the valve against corrosion. The result is that the inside parts of the valve may be manufactured from non-corrosion-resistant, easy-to-machine and inexpensive materials.

In connection with an electronic controller which can be seated onto the electromagnetic valve and, in the present example, also receives a magnet coil that is needed for actuation of the valve, the housing of the controller no longer requires to be hermetically sealed to water. Consequently, there is no need for the previously known sealing provisions between the valve accommodating member 4 and the electronic controller. Another advantage can be seen in the minimum requirement of material for the use of sheet-metal parts for the sleeve members 1, 2 and cold-formed component parts for the magnet core 6, the magnet armature 7, valve seat 5 and, if necessary, also for the tappet 19.

The valve adjustment is extremely simple and insensitive to tolerances. The chosen construction obviates the need for a fluid-tight welding seam construction.

Upon requirement, a diaphragm function can be achieved by a corresponding punching operation in the second sleeve member 2. As mentioned already, the tappet can be made of plastic for weight reduction purposes, or by cold-impact forming technique.

This also satisfies all conditions for operating the electromagnetic valve as a control valve of analog actuation, provided a suitable control electronics is employed.

| List of Reference Numerals: | |
| --- | --- |
| 1 | first sleeve member |
| 2 | second sleeve member |
| 3 | retaining collar |
| 4 | valve accommodating member |
| 5 | valve seat |
| 6 | magnet core |
| 7 | magnet armature |
| 8 | valve closure member |
| 9 | stepped portion |
| 10 | filter |
| 11 | resetting spring |
| 12 | sealing seat |
| 13 | pressure fluid channel |
| 14 | pressure fluid channel |
| 15 | through-bore |
| 16 | non-return valve |
| 17 | plate-type filter |
| 18 | outside calked portion |
| 19 | tappet |
| H | residual air slot |

What is claim is:

1. Electromagnetic valve, comprising:
a magnet armature,
a magnet core member,
a tappet having a valve closure portion, and
a valve housing having a valve seat, wherein the valve housing is composed of a first deep-drawn sleeve member and a second sleeve member inserted telescopically with the first sleeve member, wherein the second sleeve member includes at an open end remote from the first sleeve member, a metal sealing seat that is in sealing abutment to a bore wall of a valve accommodating member, wherein the resetting spring with its end facing the magnet armature is supported on the tappet in form lock therewith, and in that a spring end facing the valve seat is supported on a tapered stepped portion of the second sleeve member which centers the tappet in relation to the valve seat.

2. Electromagnetic valve as claimed in claim 1, wherein the second sleeve member at the tapered stepped portion includes a filter.

3. Electromagnetic valve as claimed in claim 1 wherein the first sleeve member in the direction of the valve accommodating member is configured as a retaining collar, and wherein the first sleeve member, in an area that telescopically overlaps with said second sleeve member, has welded connection with the second sleeve member.

4. Electromagnetic valve as claimed in claim 3, wherein an open end of the first sleeve member which is slipped past the second sleeve member includes a retaining collar which is fastened in the valve accommodating member.

5. Electromagnetic valve as claimed in claim 1, wherein the valve seat is arranged in an open end of the second sleeve member, and wherein the magnet armature is arranged in a closed end portion of the first sleeve member.

6. Electromagnetic valve as claimed in claim 5, wherein the magnet armature is configured as a cold-formed component part on which the tappet abuts under the urging of a resetting spring.

7. Electromagnetic valve as claimed in claim 5, wherein the magnet core is annular and is preferably made of a cold-formed component.

* * * * *